(12) United States Patent
Murakami (10) Patent No.: US 9,163,690 B2
(45) Date of Patent: Oct. 20, 2015

(54) HYDRAULIC SHOCK ABSORBER (71) Applicant: SHOWA CORPORATION, Gyodoa-shi, Saitama (JP)

(72) Inventor: Yosuke Murakami, Fukuroi (JP)

(73) Assignee: Showa Corporation, Saitama (JP)

( * ) Notice: Subject to any disclaimer, the term of this patent is extended or adjusted under 35 U.S.C. 154(b) by 570 days.

(21) Appl. No.: 13/663,097

(22) Filed: Oct. 29, 2012

(65) Prior Publication Data
US 2013/0256070 A1 Oct. 3, 2013

(30) Foreign Application Priority Data

Mar. 29, 2012 (JP) ................. 2012-077699

(51) Int. Cl.
F16F 9/36 (2006.01)
F16F 9/18 (2006.01)
F16F 9/32 (2006.01)
(52) U.S. Cl.
CPC ............... F16F 9/185 (2013.01); F16F 9/3235 (2013.01)

(58) Field of Classification Search
CPC ........... F16F 9/362; F16F 9/364; F16F 9/366; F16F 9/36; F16F 9/3242; F16F 9/3235
USPC ........................ 188/297, 315, 322.17, 322.19
See application file for complete search history.

(56) References Cited

FOREIGN PATENT DOCUMENTS

JP 2009-156750 1/2009

Primary Examiner — Robert A Siconolfi
Assistant Examiner — Vu Q Nguyen
(74) Attorney, Agent, or Firm — Babcock IP, PLLC (57) ABSTRACT A hydraulic shock absorber having a plurality of tubes (outer and inner tubes), which constitute a multiple-walled cylinder to be inserted inside a damper tube, held and secured between a rod guide and a support piece under a compressive load applied to all of the tubes. In the hydraulic shock absorber (10), a contact surface (P), where an end surface of the inner tube (13B), of the tubes (13A, 13B) of the cylinder (13), is in contact with a seating surface (201) of a rod guide (21) in the axial direction, is formed intermittently at a plurality of circumferential positions on the end surface of the inner tube 13B in the state where the tubes (13A, 13B) of the cylinder (13) are held and secured.

12 Claims, 9 Drawing Sheets

HYDRAULIC SHOCK ABSORBER

CROSS-REFERENCES TO RELATED APPLICATIONS

This application claims the benefit of Japan Patent Application No. 2012-077699 filed on Mar. 29, 2012 with the Japanese Patent Office, the entire contents of which are hereby incorporated by reference in the entirety.

TECHNICAL FIELD

The present invention relates to a hydraulic shock absorber.

BACKGROUND

A hydraulic shock absorber, as disclosed in Japanese Unexamined Patent Application Publication No. 2011-12738 (Patent Document 1), includes a damper tube, a rod guide disposed in one open end portion of the damper tube, a support piece disposed in the other end portion thereof, a cylinder inserted inside the damper tube held and secured between the rod guide and the support piece in the axial direction, the cylinder being double-walled with an outer tube and an inner tube fitted together, and a piston rod penetrating the rod guide and slidably inserted inside the inner tube.

SUMMARY OF THE INVENTION

To retain compressive strength, provide resistance to vibration, and prevent rattling sounds for a hydraulic shock absorber as disclosed in Patent Document 1, it is ideal that the outer tube and the inner tube, constituting a double-walled cylinder inserted inside the damper tube, are held and secured between the rod guide and the support piece under a compressive load applied thereto. However, it is difficult to apply a compressive load equally on both of the tubes because of variation in dimensional accuracy of length between the outer tube and the inner tube.

It may be possible to absorb the rattling by placing elastic parts on the ends of the outer tube and the inner tube constituting the double-walled cylinder. However, this may present an inconvenience of an increased number of parts by the addition of the redundant elastic parts. Moreover, spring or rubber members, which may be normally conceived as the elastic parts, may not have a rigidity sufficient to bear part of the necessary compressive strength.

The present invention seeks a solution to the above-described problems of a hydraulic shock absorber in which the plurality of tubes (outer and inner tubes) of the multiple-walled cylinder inserted inside the damper tube are sandwiched and secured between the rod guide and the support piece by applying a compressive load on all of the tubes.

The present invention provides a hydraulic shock absorber which includes a damper tube, a rod guide disposed in one open end portion of the damper tube, a support piece disposed in the other end portion thereof, a cylinder inserted inside the damper tube and sandwiched and secured between the rod guide and the support piece in the axial direction, the cylinder being multiple-walled with N units of tubes fitted together, and a piston rod penetrating the rod guide and slidably inserted inside the innermost tube of the cylinder. In this hydraulic shock absorber, contact surfaces, where at least one end surface of (N−1) units of tubes of the cylinder is in contact with the seating surface of at least one of the rod guide and the support piece in the axial direction, are formed at a plurality of circumferential positions on the end surface of the tubes in the state where the tubes of the cylinder are sandwiched and secured.

DESCRIPTION OF EMBODIMENTS

Figure 1:
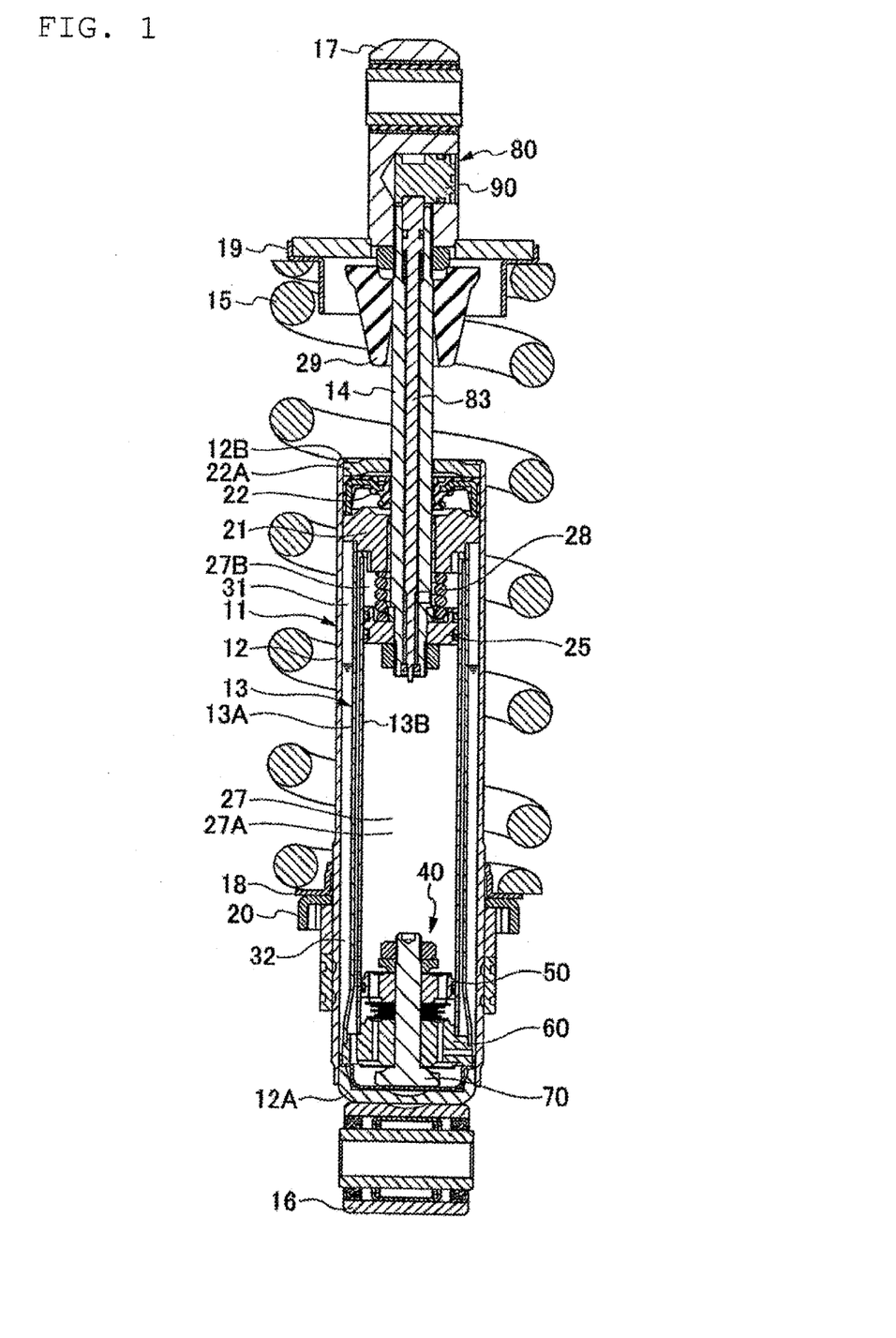
FIG. 1 is a cross-sectional view showing an entirety of a hydraulic shock absorber.
Figure 2:
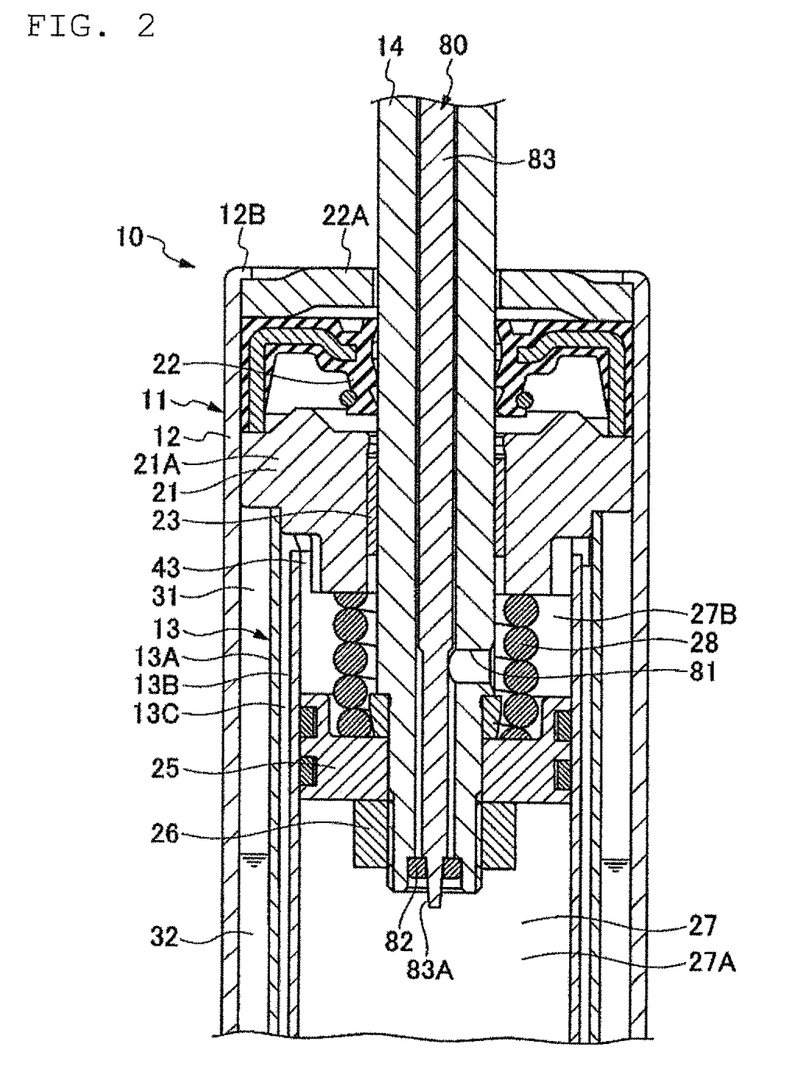
FIG. 2 is a cross-sectional view of the upper part of FIG. 1.
Figure 3:
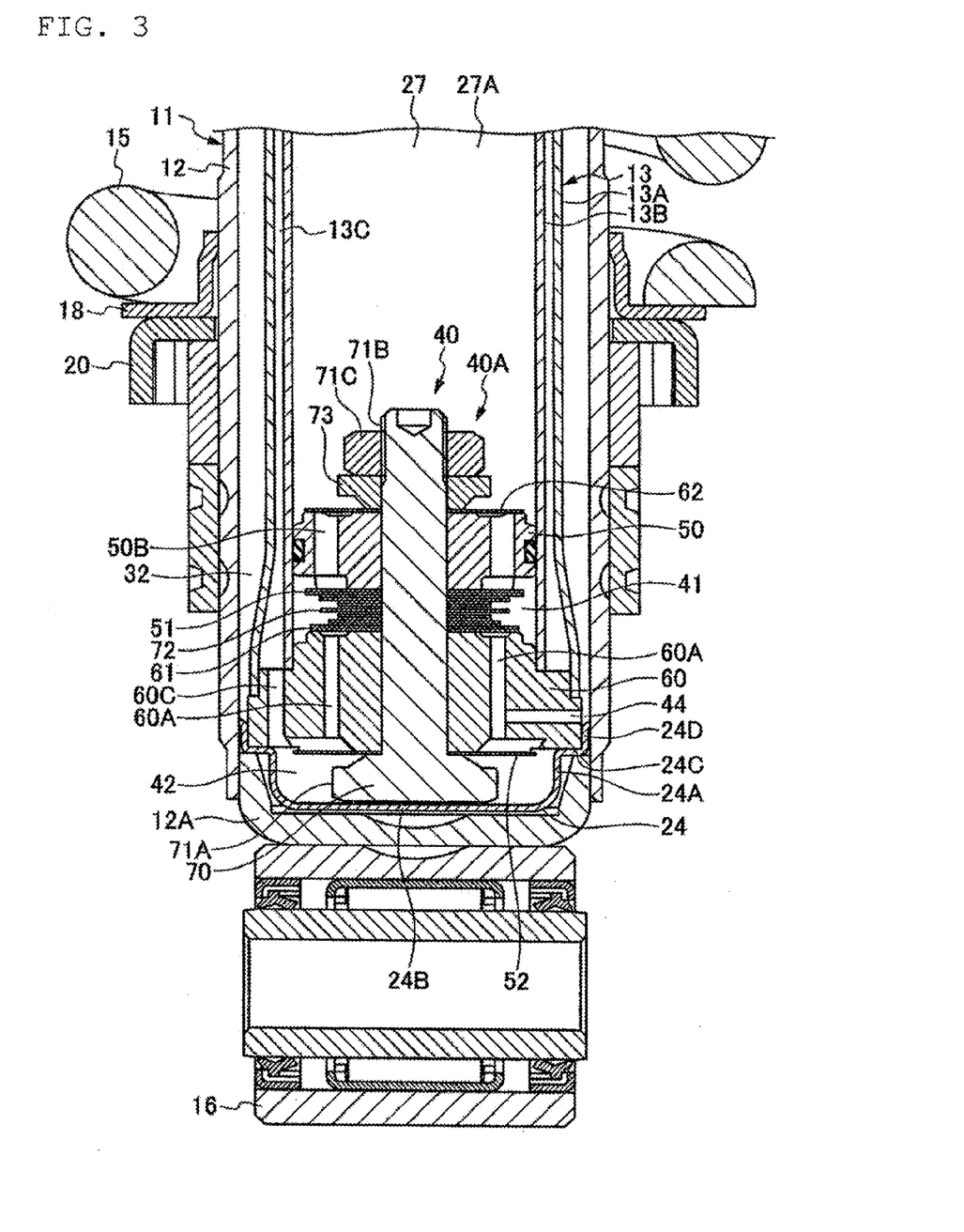
FIG. 3 is a cross-sectional view of the lower part of FIG. 1.

As shown in FIGS. 1 to 3, a hydraulic shock absorber 10 includes a damper case 11, which is mounted on the axle side, the damper case 11 having a damper tube 12, and a damper cylinder 13 inserted inside the damper tube 12. And the hydraulic shock absorber 10 has a piston rod 14, which is mounted on the vehicle body side and slidably inserted into the central portion of the cylinder 13 in the damper tube 12 of the damper case 11, and a suspension spring 15 set around the damper case 11 and the piston rod 14.

The damper case 11 has an axle side mounting member 16 on the central exterior portion of the bottom cap 12A of the damper tube 12, and the piston rod 14 has a vehicle body side mounting member 17. A spring seat 18 is disposed on an outer periphery of the damper tube 12 of the damper case 11, and a spring seat 19 is disposed on an outer periphery of the vehicle body side mounting member 17 of the piston rod 14. The suspension spring 15, which is set between the spring seat 18 and the spring seat 19, absorbs the forces of impact the vehicle receives from the road surface with the spring force thereof. Note that the spring seat 18 is raised or lowered by a load adjuster 20, thereby adjusting the spring force of the suspension spring 15.

The damper tube 12 of the damper case 11 has a rod guide 21, through which the piston rod 14 penetrates, in the open portion thereof. The rod guide 21 has a larger outside-diameter portion of a head portion 21A thereof, which is inserted in a liquid-tight manner into the damper tube 12, and an inside-diameter portion provided with an oil seal 22 and a bush 23, which has the piston rod 14 slidably inserted in a liquid-tight manner.

The hydraulic shock absorber 10 has a cylinder 13 fitted inside the damper tube 12 of the damper case 11. The cylinder 13 includes an outer tube 13A and an inner tube 13B. The damper case 11 is fixed to a cup-shaped bottom cap 12A and a lower end inner periphery of the damper tube 12 is fitted and secured by welding or the like to the outer periphery of the bottom cap 12A.

An outer periphery of the barrel portion 24A of a cup-shaped bottom plate 24 of a pressed steel plate is fitted inside the bottom cap 12A in a centered manner with a space axially provided therebetween (the bottom portion 24B of the bottom plate 24 is spaced apart by a certain gap from a bottom of the bottom cap 12A). A larger outside-diameter portion of an outer periphery of a second base piston 60 (support piece), to be described below, is press-fitted in a centered manner into an inner periphery of a fitting cylindrical portion 24D rising from an outer periphery of a flange 24C of the bottom plate 24, which is placed on the upper end surface of the bottom cap 12A. A lower end surface of the second base piston 60 is placed on an upper surface of the flange 24C of the bottom plate 24. And a lower end inner periphery of the outer tube 13A and the inner tube 13B of the cylinder 13 are press-fitted in a fixed manner on the middle outside-diameter portion and the smaller outside-diameter portion, respectively, of the second base piston 60.

On the other hand, the upper end inner peripheries of the outer tube 13A and the inner tube 13B of the cylinder 13 are fixed by press-fitting or the like on the middle outside-diameter portion and the smaller outside-diameter portion, respectively, provided below the head portion 21A of the rod guide 21. And the damper tube 12, with the head portion 21A of the rod guide 21 attached by insertion therein, projects above a washer 22A disposed on the upper surface of the oil seal 22 which is located above the head portion 21A, and the projecting end is formed as a clinched portion 12B. The damper tube 12 therefore holds and secures the outer tube 13A and the inner tube 13B of the cylinder 13 in the axial direction between the bottom cap 12A and the clinched portion 12B thereof through the medium of the rod guide 21, the oil seal 22, the washer 22A, the bottom plate 24, and the second base piston 60.

The hydraulic shock absorber 10 has the cylinder 13 inserted inside the damper tube 12 sandwiched and secured in the axial direction between the rod guide 21 disposed in one open end portion of the damper tube 12 and the second base piston 60 disposed in the other end portion of the damper tube 12. The cylinder 13 is double-walled with two tubes 13A, 13B fitted together, and the piston rod 14 penetrating the rod guide 21 is slidably inserted inside the inner tube 13B of the cylinder 13.

Thus, the hydraulic shock absorber 10 has a damper case 11 as a triple-walled tube in which the damper tube 12, the outer tube 13A and the inner tube 13b, which constitute a double-walled cylinder 13, are coaxially disposed. An oil chamber 27, which includes a piston-side oil chamber 27A and a rod-side oil chamber 27B, is formed inside the inner tube 13B, and an outside passage 13C communicating the piston-side oil chamber 27A and the rod-side oil chamber 27B with each other is formed by an annular interspace between the outer tube 13A and the inner tube 13B. Also, an annular interspace between the damper tube 12 and the outer tube 13A serves as an air chamber 31 and an oil reservoir chamber 32.

The hydraulic shock absorber 10 is structured so that a piston 25 is secured with a nut 26 to the end of the piston rod 14 when the piston rod 14 is inserted into the central part of the damper tube 12 and the cylinder 13 of the damper case 11. The piston 25 inserted slidably within an inner periphery of the inner tube 13B comparts the oil chamber 27 in the cylinder 13 into the piston-side oil chamber 27A and the rod-side oil chamber 27B. Also, note that the part with reference numeral 28 is a rebound spring and the part with reference numeral 29 is a bump rubber.

The hydraulic shock absorber 10 also has the air chamber 31 and the oil reservoir chamber 32 in the upper part and the lower part, respectively, of the annular interspace between the damper tube 12 and the outer tube 13A. The oil reservoir chamber 32, which communicates with the oil chamber 27 in the cylinder 13, can make up for the volume (including the volume of temperature expansion of the oil) of the piston rod 14 advancing and retracting in the oil chamber 27 of the cylinder 13.

The hydraulic shock absorber 10 is provided with a damping force generator 40 in a flow path between the piston-side oil chamber 27A and the rod-side oil chamber 27B via the outside passage 13C in the cylinder 13.

The damping force generator 40 has a first base piston 50 and a second base piston 60 secured side by side in two positions along the axial direction of the cylinder 13.

The damping force generator 40 is set in place with the first and second base pistons 50, 60 attached by insertion into the lower end inner peripheries of the inner tube 13B and the outer tube 13A of the cylinder 13, in a form of a valve unit 40A fixedly installed around a bolt 70.

The valve unit 40A of the damping force generator 40 has a compression-stroke check valve 52, the second base piston 60, an extension-stroke damping valve 61, a valve stopper 72, a compression-stroke damping valve 51, a first base piston 50, an extension-stroke check valve 62, and a valve stopper 73, which are placed in order on the head portion 71A of the bolt 70 in a skewered manner around the outer periphery of the threaded portion 71B of the bolt 70 and then secured with a nut 71C screwed on the threaded portion 71B.

The valve unit 40A of the damping force generator 40 is installed such that a larger outside-diameter portion of the second base piston 60 is fitted to the flange 24C and fitting cylindrical portion 24D of the bottom plate 24 which is fitted into the bottom cap 12A with the space axially provided therebetween as described above. And the lower end inner peripheries of the outer tube 13A and the inner tube 13B of the cylinder 13 are press-fitted on the middle outside-diameter portion and the smaller outside-diameter portion on the outer periphery of the second base piston 60 as described above. The first base piston 50 is fitted in a liquid-tight manner inside the inner tube 13B of the cylinder 13 via an O-ring provided on the outer periphery thereof. In this manner, the second base piston 60 of the valve unit 40A is fixed to the bottom at one end of the cylinder 13, and the first base piston 50 of the valve unit 40A is fixed to the inner periphery of the cylinder 13.

The damping force generator 40 has an annular space between the first base piston 50 and the second base piston 60 inside the inner tube 13B as an extension/compression shared passage 41. The space above the first base piston 50 inside the inner tube 13B is the piston-side oil chamber 27A. The space below the second base piston 60 inside the inner tube 13B is an extension/compression shared passage 42 that communicates with the rod-side oil chamber 27B via a hole-shaped passage 60C drilled in the second base piston 60 and an outside passage 13C between the outer tube 13A and the inner tube 13B of the cylinder 13. Formed in a notch-shaped manner in the smaller outside-diameter portion of the rod guide 21, in this embodiment, at a side facing to the upper end of the inner tube 13B is an extension/compression shared passage 43 that communicates the rod-side oil chamber 27B with the outside passage 13C.

The damping force generator 40 is of a structure such that the first base piston 50 is provided with compression-stroke passages (not shown) to be opened or closed by the compression-stroke damping valve 51 and extension-stroke passages 50B to be opened or closed by the extension-stroke check valve 62. And the second base piston 60 is provided with compression-stroke passages (not shown) to be opened or closed by the compression-stroke check valve 52 and extension-stroke passages 60A to be opened or closed by the extension-stroke damping valve 61. The damping force generator 40 provides a communication between the piston-side oil chamber 27A and the rod-side oil chamber 27B in the cylinder 13 through the extension/compression shared passages 41, 42, 43, the compression-stroke passages and extension-stroke passages 50B provided in the first base piston 50, the compression-stroke passages, extension-stroke passages 60A, and hole-shaped passage 60C provided in the second base piston 60, and the outside passage 13C provided in the annular interspace between the outer tube 13A and the inner tube 13B of the cylinder 13 (the piston 25 has no passages communicating the piston-side oil chamber 27A and the rod-side oil chamber 27B).

The damping force generator 40 is also of a structure such that the second base piston 60 is provided with a connecting passage 44. The connecting passage 44 communicates a middle portion (part communicating with the extension/compression shared passage 41) between the compression-stroke damping valve 51 and the compression-stroke check valve 52 provided in the respective compression-stroke passages of the first base piston 50 and the second base piston 60 with the oil reservoir chamber 32. The connecting passage 44 also communicates the middle portion (part communicating with the extension/compression shared passage 41) between the extension-stroke damping valve 61 and the extension-stroke check valve 62 provided in the respective extension-stroke passages 50B, 60A of the first base piston 50 and the second base piston 60 with the oil reservoir chamber 32.

When the second base piston 60 is fitted into the damper tube 12 and the cylinder 13 of the damper case 11 as described above, part of an outer periphery of the larger outside-diameter portion to be press-fitted into a fitting cylindrical portion 24D of the bottom plate 24 faces the oil reservoir chamber 32. A horizontal hole drilled in a radial direction from the above-mentioned part of the outer periphery of the larger outside-diameter portion of the second base piston 60 to reach the middle portion of the extension-stroke passage 60A is the connecting passage 44.

Accordingly, in the compression stroke of the damping force generator 40 of the hydraulic shock absorber 10, an oil in the piston-side oil chamber 27A of the cylinder 13 is led to the oil reservoir chamber 32 through the compression-stroke passages which channel the oil from the outside passage 13C of the cylinder 13 toward the rod-side oil chamber 27B (the extension/compression shared passages 41, 42, 43, the compression-stroke passages and the hole-shaped passage 60C). The oil goes through the connecting passage 44 in the middle part of the compression-stroke passages between the compression-stroke damping valve 51 provided on the upstream side thereof and the compression-stroke check valve 52 provided on the downstream side thereof.

Also, in the extension stroke of the damping force generator 40, the oil in the rod-side oil chamber 27B of the cylinder 13 is led to the oil reservoir chamber 32 through the extension-stroke passages which channel the oil from the outside passage 13C of the cylinder 13 toward the piston-side oil chamber 27A (the extension/compression shared passages 41, 42, 43, the extension-stroke passages 50B, 60A, and the hole-shaped passage 60C). The oil goes through the connecting passage 44 in the middle part of the extension-stroke passages between the extension-stroke damping valve 61 provided on the upstream side thereof and the extension-stroke check valve 62 provided on the downstream side thereof.

The hydraulic shock absorber 10 is provided with a damping force adjuster 80.

Figure 4:
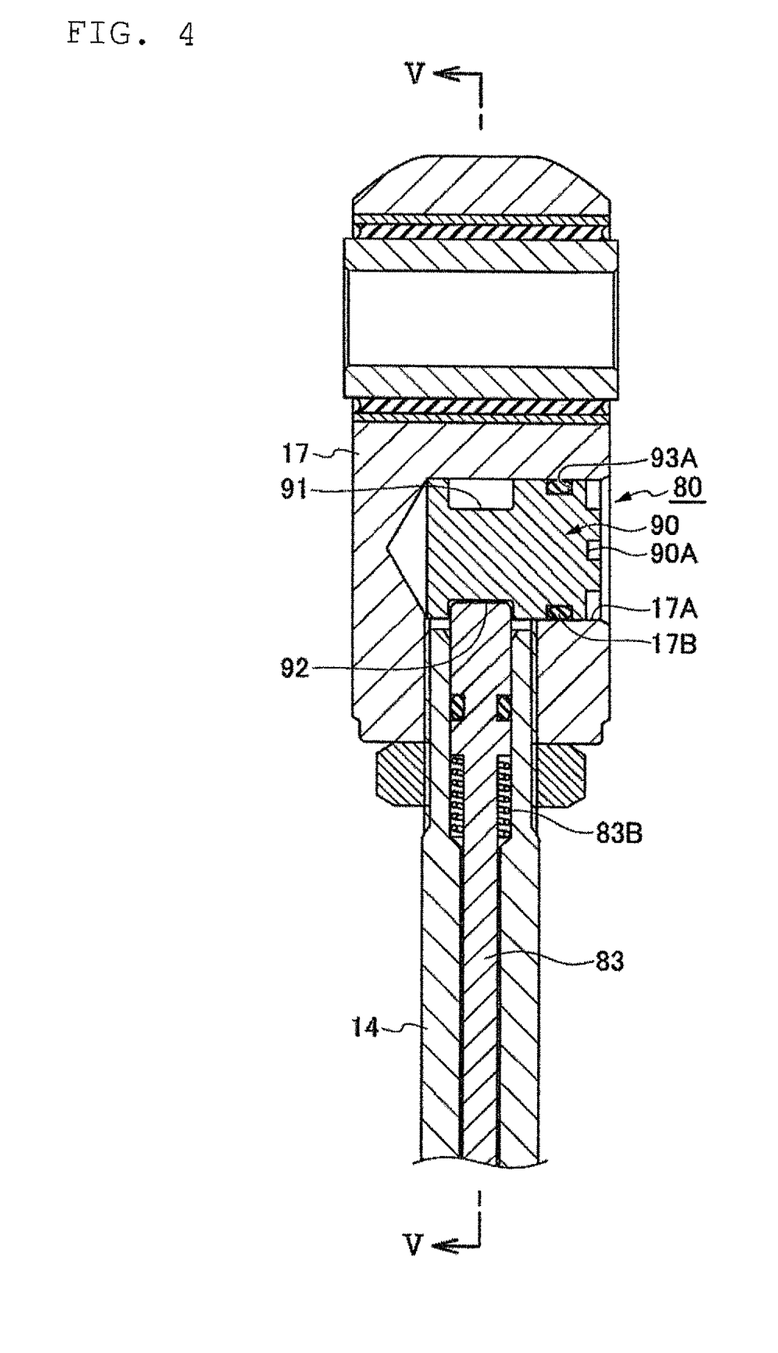
FIG. 4 is a cross-sectional view showing a damping force adjuster.

The damping force adjuster 80 has a bypass passage 81 formed in the piston rod 14 to communicate the piston-side oil chamber 27A and the rod-side oil chamber 27B with each other, and the bypass passage 81 is comprised of a vertical hole opening on the piston-side oil chamber 27A and a horizontal hole opening on the rod-side oil chamber 27B. The damping force adjuster 80 has a valve seat 82 provided at the open end of the vertical hole of the bypass passage 81 and an adjusting rod 83 having a needle valve 83A at the end thereof facing the valve seat 82. An adjusting rod 83 is inserted in the hollow portion of the piston rod 14 in a liquid-tight manner with an O-ring such that it can advance or retract in the axial direction, with the needle valve 83A adjusting the opening area of the valve seat 82.

Figure 5:
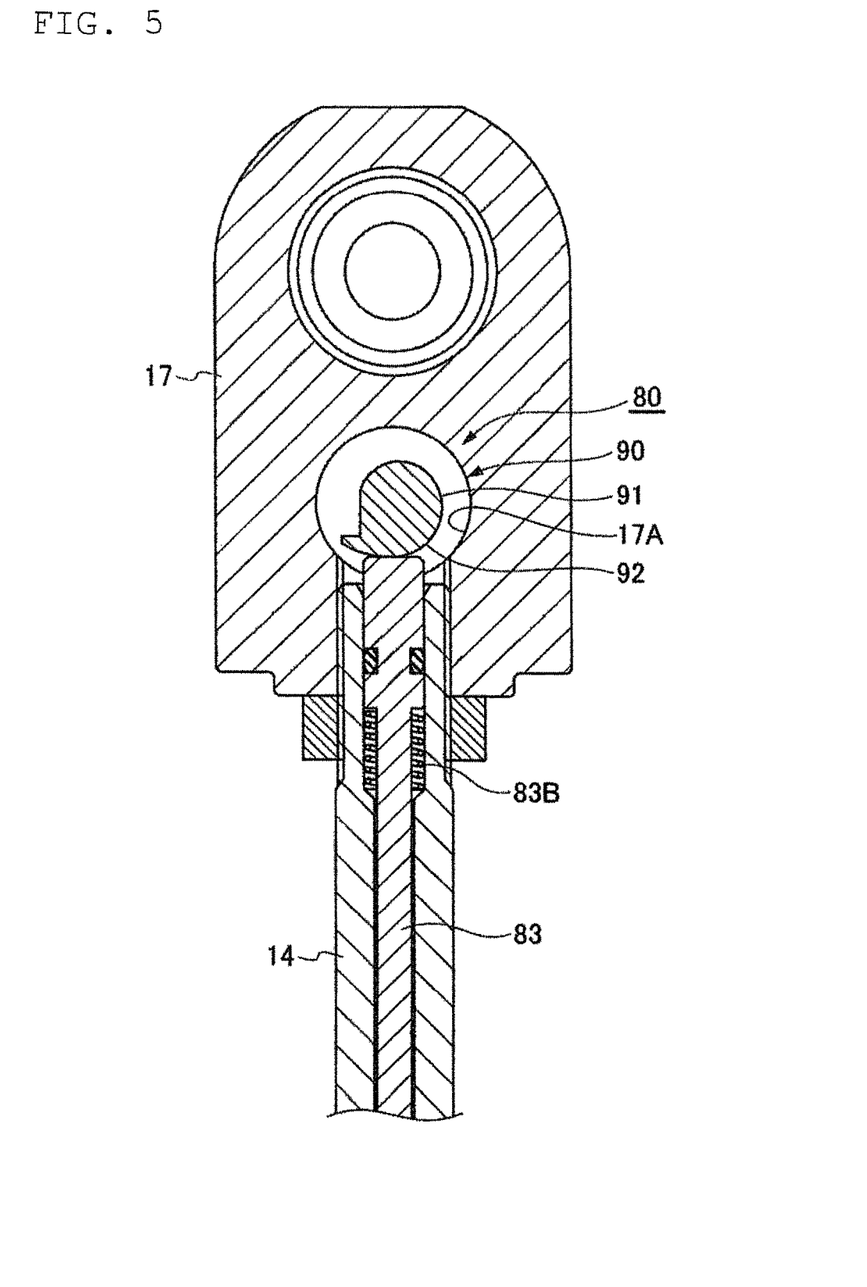
FIG. 5 is a cross-sectional view of FIG. 4 taken along the line V-V.

As shown in FIGS. 4 and 5, the damping force adjuster 80 is so disposed that the base end portion of the adjusting rod 83 extends from the piston rod 14 into the vehicle body side mounting member 17 (support member). And the adjusting rod 83 has the base end portion thereof in pressure contact with a cam surface 92 of a cam 91 of an adjuster 90 under a thrust force of the hydraulic pressure in the piston-side oil chamber 27A and a spring force of a spring 83B set around the adjusting rod 83 in the hollow portion of the piston rod 14. The adjuster 90, which is pivotally supported in a liquid-tight manner with an O-ring 17B by a horizontal pivotal support hole 17A provided in the vehicle body side mounting member 17, has an operating portion 90A on the end surface thereof facing outside the vehicle body side mounting member 17. Note that the pivotal support hole 17A is a straight hole of a uniform bore with one open end and the other bottomed end and that the O-ring 17B is set in an annular groove 93A in the outer periphery of the adjuster 90 closer to the operating portion 90A than the cam 91.

The damping force adjuster 80 causes the adjusting rod 83 to advance or retract by the turning of the cam 91 of the adjuster 90, thereby adjusting the opening area of the valve seat 82 in the bypass passage 81 by the needle valve 83A of the adjusting rod 83. Thus the damping force adjuster 80 adjusts the compression-stroke damping force and the extension-stroke damping force by giving throttling resistance to the oil flowing through the bypass passage 81.

Accordingly, the hydraulic shock absorber 10 performs the damping action as described below:

(Compression Stroke)

The pressure of the oil in the piston-side oil chamber 27A rises and pushes open the compression-stroke damping valve 51 in the compression-stroke passage of the first base piston 50 of the damping force generator 40, thereby generating a compression-stroke damping force. The oil flowing from the compression-stroke damping valve 51 to the extension/compression shared passage 41 is divided into two flows in the extension-stroke passage 60A of the second base piston 60. One of the oil flows goes from the compression-stroke check valve 52 in the compression-stroke passage of the second base piston 60 and flows into the rod-side oil chamber 27B by passing through the extension/compression shared passage 42, the hole-shaped passage 60C of the second base piston 60, the outside passage 13C of the cylinder 13 and the extension/compression shared passage 43. The remainder of the oil flow is discharged into the oil reservoir chamber 32 from the connecting passage 44 of the second base piston 60. The remainder of the oil flows discharged into the oil reservoir chamber 32 compensates for the lost oil by the advance volume of the piston rod 14.

Also, in the process of the oil in the piston-side oil chamber 27A flowing out into the rod-side oil chamber 27B through the bypass passage 81 bypassing the piston 25, a compression-stroke damping force is produced relative to the opening area of the valve seat 82 of the bypass passage 81 adjusted by the adjuster 90.

(Extension Stroke)

As the pressure of the oil in the rod-side oil chamber 27B rises, the oil flows through the extension/compression shared passage 43 and the outside passage 13C of the cylinder 13 and flows into the hole-shaped passage 60C of the second base piston 60 of the damping force generator 40 and the extension/compression shared passage 42. This will push open the extension-stroke damping valve 61 in the extension-stroke passage 60A of the second base piston 60, thereby producing an extension-stroke damping force. The oil flowing from the extension-stroke damping valve 61 to the extension/compression shared passage 41 joins the oil supplied from the oil reservoir chamber 32 through the connecting passage 44 of the second base piston 60 and the extension-stroke passage 60A and then flows into the piston-side oil chamber 27A passing through the extension-stroke check valve 62 in the extension-stroke passage 50B of the first base piston 50. The oil supplied from the oil reservoir chamber 32 compensates for the lack of oil by the retraction volume of the piston rod 14.

Also, in the process of the oil in the rod-side oil chamber 27B flowing out into the piston-side oil chamber 27A through the bypass passage 81 bypassing the piston 25, an extension-stroke damping force is produced relative to the opening area of the valve seat 82 of the bypass passage 81 adjusted by the adjuster 90.

Hereinbelow, a detailed description will be given of a structure of the hydraulic shock absorber 10 in which the cylinder 13 (double-walled with an outer tube 13A and an inner tube 13B) inserted inside the damper tube 12 is sandwiched and secured in the axial direction between the rod guide 21 disposed in one open end portion of the damper tube 12 and the second base piston 60 (support piece) disposed in the other end portion of the damper tube 12 (see FIGS. 6 to 9).

In the hydraulic shock absorber 10, when the two tubes, namely, the outer tube 13A and the inner tube 13B, of the cylinder 13 are in a sandwiched and secured state as described above, the lower end inner peripheries of the outer tube 13A and the inner tube 13B are press-fitted on the middle outside-diameter portion and the smaller outside-diameter portion, respectively, of the second base piston 60. At the same time, the lower end faces of the outer tube 13A and the inner tube 13B are in contact with the outer peripheral seating surfaces of the middle outside-diameter portion and the smaller outside-diameter portion, respectively, of the second base piston 60 in the axial direction.

Also, as shown in FIGS. 6 to 9, in the hydraulic shock absorber 10, when the two tubes, namely, the outer tube 13A and the inner tube 13B, of the cylinder 13 are in a sandwiched and secured state as described herein above, the upper end inner peripheries of the outer tube 13A and the inner tube 13B are press-fitted on the middle outside-diameter portion 100 and the smaller outside-diameter portion 200, respectively, provided below the head portion 21A of the rod guide 21. At the same time, the upper end faces of the outer tube 13A and the inner tube 13B are in contact in the axial direction with the outer peripheral seating surfaces 101, 201 (projections 202 of the outer peripheral seating surface 201 to be discussed later) of the middle outside-diameter portion 100 and the smaller outside-diameter portion 200, respectively, of the rod guide 21.

It is to be noted here that, in the present embodiment, contact surfaces P, where the upper end surface of the inner tube 13B of one of the two tubes, namely, the outer tube 13A and the inner tube 13B, of the cylinder 13 is in contact with the outer peripheral seating surface 201 of the smaller outside-diameter portion 200 of the rod guide 21 in the axial direction, are formed intermittently (not continuously along the circumference), at a plurality of circumferential positions at predetermined intervals on the end surface of the inner tube 13B. The contact surface P of the upper end surface of the outer tube 13A in contact with the outer peripheral seating surface 101 of the middle outside-diameter portion 100 of the rod guide 21 in the axial direction is formed continuously along the circumference on the upper end surface of the outer tube 13A. It is to be noted here that, in the present embodiment, though the contact surfaces are formed at a plurality of circumferential positions at predetermined intervals on the end surface of the inner tube 13B, the contact surfaces may be formed thereupon at random intervals.

Figure 6:
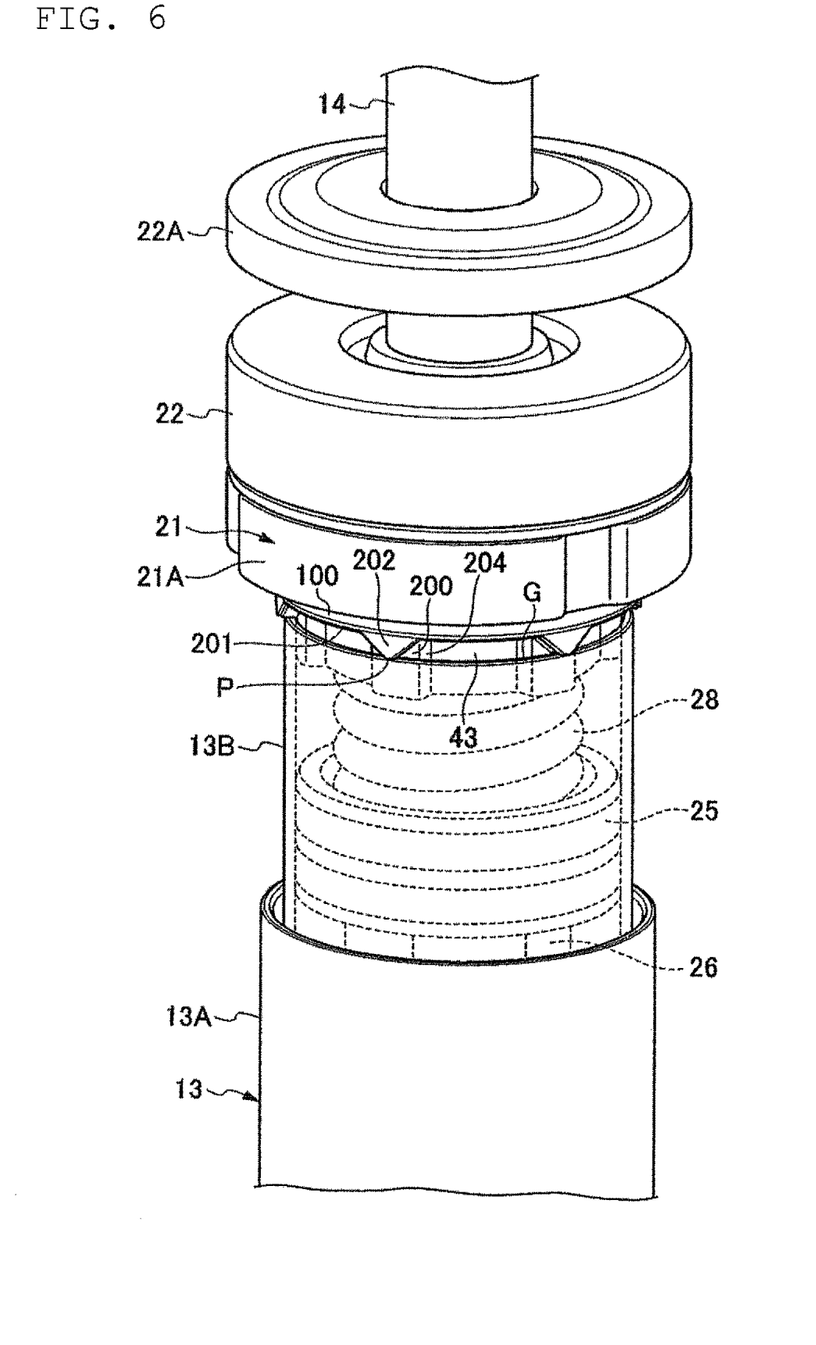
FIG. 6 is a perspective view showing an assembled structure of a cylinder and a rod guide.
Figure 8:
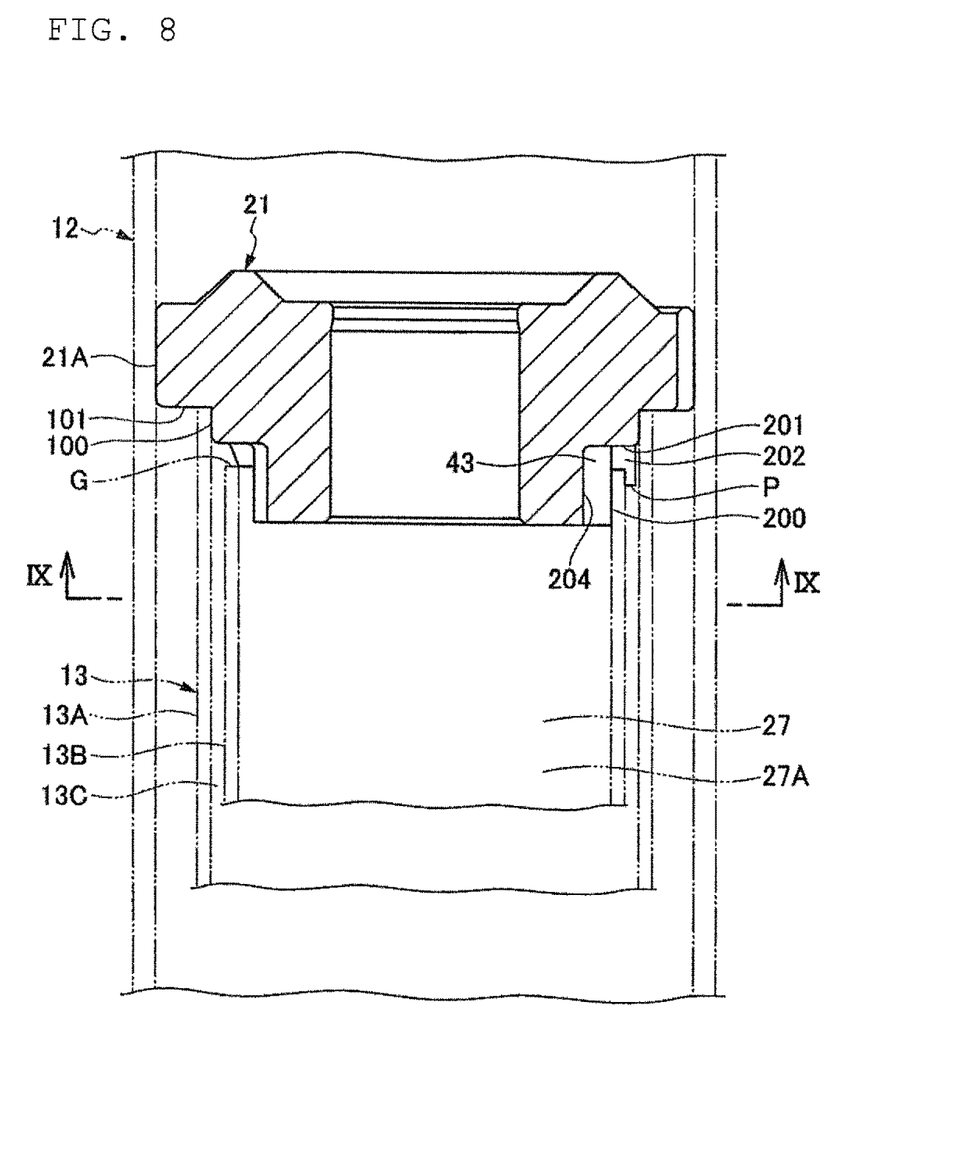
FIG. 8 is a schematic sectional view showing an assembled structure of a cylinder and a rod guide.
Figure 9:
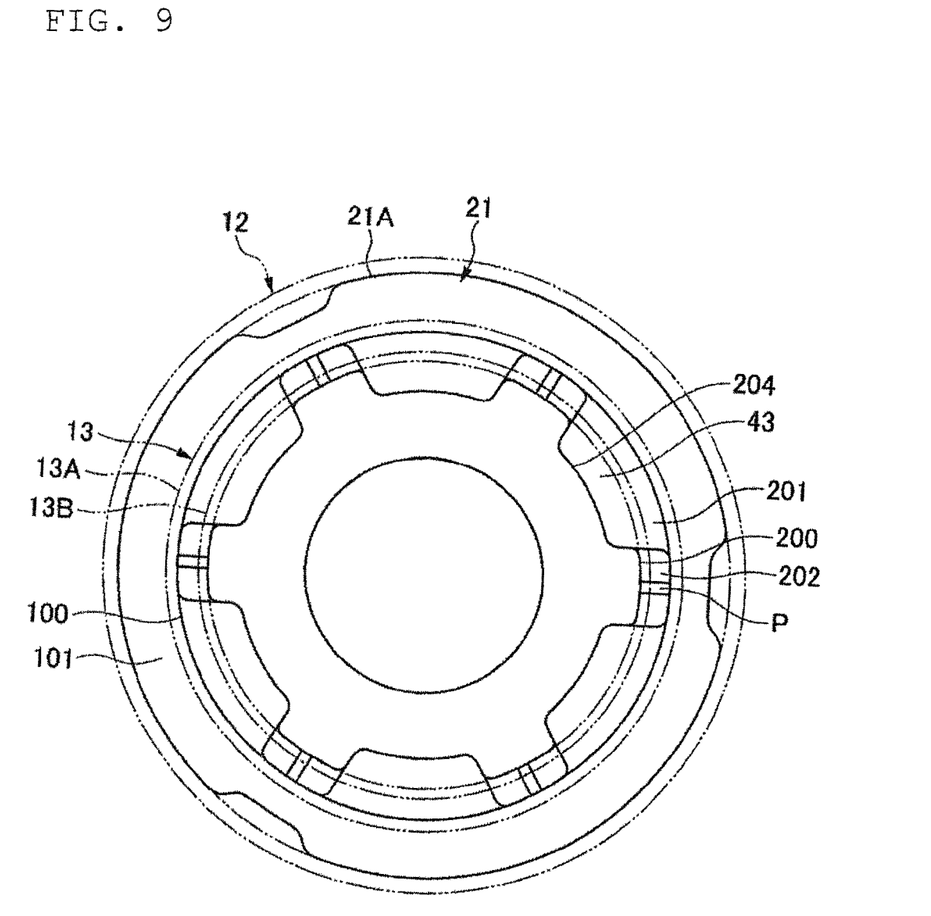
FIG. 9 is a schematic end view of FIG. 8 taken along the line IX-IX

More specifically, the outer peripheral seating surface 201 of the smaller outside-diameter portion 200 provided below the head portion 21A of the rod guide 21 has triangular projections 202 rising thereon at a plurality of circumferential positions. And the top surfaces of the projections 202 on the outer peripheral seating surface 201 form the contact surfaces P which are in contact with the upper end surface of the inner tube 13B in the axial direction.

Note that, in this embodiment, the contact surfaces, where the lower end surfaces of the outer tube 13A and the inner tube 13B of the cylinder 13 are in contact with the outer peripheral seating surfaces of the middle outside-diameter portion and the smaller outside-diameter portion, respectively, of the second base piston 60 in the axial direction, are continuous circumferentially on the lower end surfaces of the outer tube 13A and the inner tube 13B.

Here, lengths of the tube 13A and 13B, La and Lb, respectively, are set relative to each other such that the upper end surface of the inner tube 13B with the contact surfaces P projecting therefrom comes into contact with the corresponding outer peripheral seating surface 201 (the top surfaces of the projections 202 of the outer peripheral seating surface 201 in this embodiment) of the rod guide 21 earlier than the upper end surface of the outer tube 13A without the contact surfaces formed thereon, in the process of sandwiching the tubes 13A and 13B of the cylinder 13 between the rod guide 21 and the second base piston 60. In this embodiment, a length L2 between the top surface (contact surface P) of the projection 202 and the outer peripheral seating surface 101 is set longer than the projecting length L1 of the upper end surface of the outer tube 13A relative to the upper end surface of the inner tube 13B before the above-mentioned sandwiching (at the assembly) of the outer tube 13A and the inner tube 13B (L1<L2) (see FIG. 7).

Figure 7:
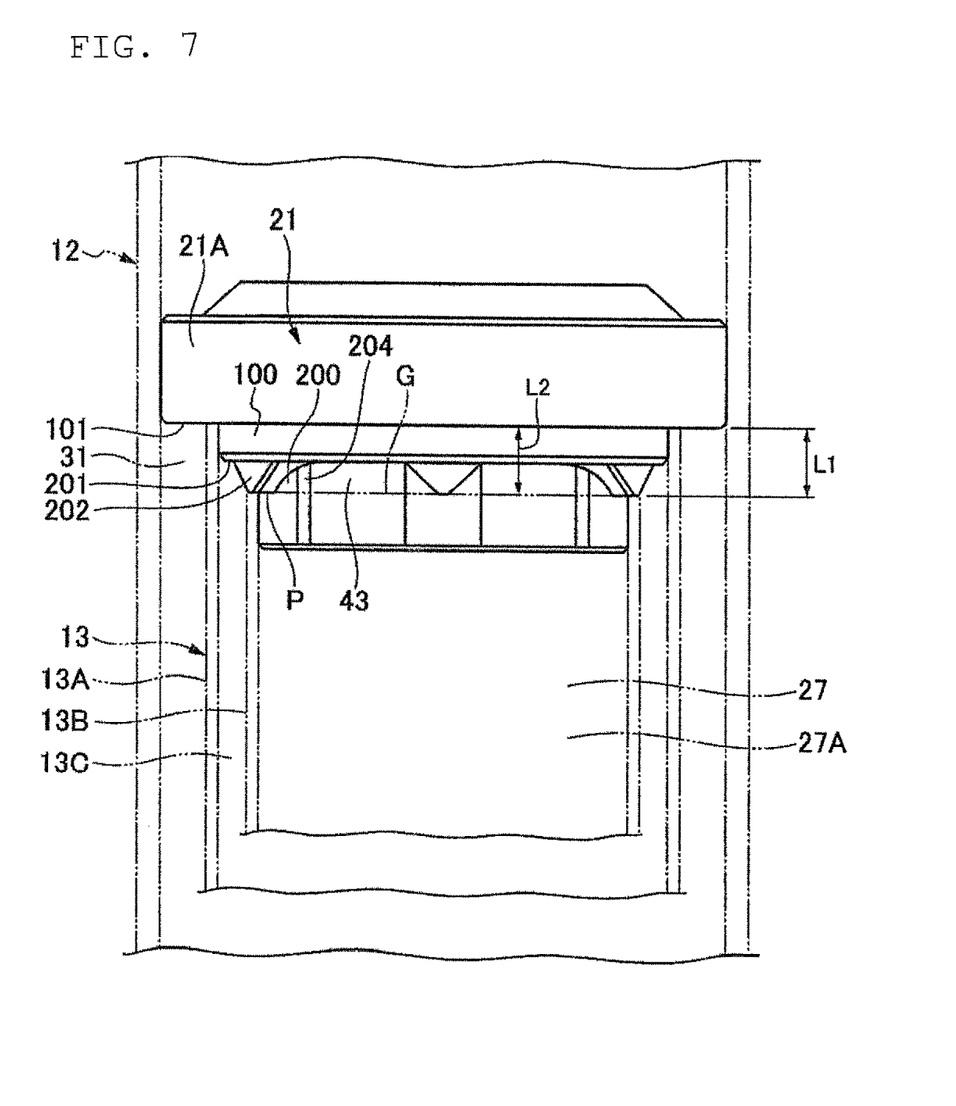
FIG. 7 is a schematic side view showing an assembled structure of a cylinder and a rod guide.

Further, the buckling load F0 to work between the upper end surface of the inner tube 13B with the contact surfaces P projecting therefrom and the corresponding outer peripheral seating surface (the top surfaces of the projections 202 of the outer peripheral seating surface 201 in this embodiment) of the smaller outside-diameter portion 200 of the rod guide 21 is set smaller than the sandwiching and securing load Fs to be applied to the cylinder 13 (the outer tube 13A and the inner tube 13B) by the rod guide 21 and the second base piston 60, which are squeezed between the bottom cap 12A and the clinched portion 12B of the damper tube 12. That is, their settings are: F0<Fs.

Also, the upper end surface of the inner tube 13B with the contact surfaces projecting therefrom has the aforementioned extension/compression shared passage 43, which is oil passages communicating the inside and the outside of the inner tube 13B in the non-contacting portions G thereof where the upper end surface of the inner tube 13B does not come in contact with the corresponding outer peripheral seating surface 201 of the smaller outside-diameter portion 200 of the rod guide 21.

More specifically, vertical grooves 204 are each formed between the smaller outside-diameter portion 200 of the rod guide 21 and the adjacent projections 202 on the outer peripheral seating surface 201 provided on the outer periphery of the smaller outside-diameter portion 200. Thus, the non-contacting portions G where the end surface of the inner tube 13B does not come in contact with the top surfaces of the projections 202, jointly with the vertical grooves 204, form the extension/compression shared passage 43 communicating the rod-side oil chamber 27B with the outside passage 13C.

Accordingly, the following operational advantages are provided by the above-described embodiments:

(a) When the two tubes, namely, the outer tube 13A and the inner tube 13B, of the double-walled cylinder are held and secured, contact surfaces P, where one end surface of the inner tube 13B of the cylinder 13 is in contact with the seating surface 201 of the rod guide 21 in the axial direction, is formed intermittently at a plurality of circumferential positions on the end surface of the inner tube 13B.

Therefore, when the cylinder 13 is sandwiched and secured between the rod guide 21 and second base piston 60 disposed in the damper tube 12 in the axial direction, a contact pressure between the end surface of the inner tube 13B with the contact surfaces P formed intermittently thereon and the corresponding seating surface of the rod guide 21 rises due to the concentration effect of the limited area of the contact surfaces P, which in turn will cause buckling and deformation of the end surface of the inner tube 13B and/or the corresponding seating surface 201 of the rod guide 21. This will absorb the variation in length (La, Lb) between the tubes 13A, 13B and enable the application of the compressive load to all of the tubes 13A, 13B without the addition of elastic members or the like.

(b) The lengths La, Lb of the tubes 13A, 13B are set relative to each other (L1<L2) such that the end surface of the inner tube 13B with the contact surfaces P formed intermittently thereon comes into contact with the corresponding seating surface 201 of the rod guide 21 earlier than the end surface of the outer tube 13A without the contact surfaces P formed thereon, in the process of sandwiching the tubes 13A, 13B of the cylinder. This will accomplish the buckling and deformation of the end surface of the inner tube 13B and/or the corresponding seating surface 201 of the rod guide 21 as described in (a) more reliably.

(c) The buckling load F0 applied between the end surface of the inner tube 13B with the contact surfaces P formed intermittently thereon and the corresponding seating surface 201 of the rod guide 21 is set smaller than the sandwiching and securing load Fs to be applied to the cylinder 13 by the rod guide 21 and the second base piston 60 (F0<Fs). This will accomplish the buckling and deformation of the end surface of the inner tube 13B and/or the corresponding seating surface 201 of the rod guide 21 as described in (a) more reliably.

(d) The gaps that necessarily result between the non-contacting portions G on the end surface of the inner tube 13B with the contact surfaces P formed intermittently thereon and the corresponding seating surface 201 of the rod guide 21 can be used as the extension/compression shared passage 43 communicating the inside and the outside of the inner tube 13B.

(e) In the hydraulic shock absorber, the cylinder 13, which is the double-walled tube of the outer tube 13A and the inner tube 13B, is set inside the damper tube 12. The oil chamber 27, including the piston-side oil chamber 27A and the rod-side oil chamber 27B, is formed by the piston rod 14 inserted inside the inner tube 13B. And the outside passage 13C communicating the piston-side oil chamber 27A and the rod-side oil chamber 27B is formed by the annular interspace between the outer tube 13A and the inner tube 13B, and the annular interspace between the damper tube 12 and the outer tube 13A is used as the oil reservoir chamber 32. Therefore, the outer tube 13A and the inner tube 13B constituting the double-walled cylinder inserted inside the damper tube 12 can be sandwiched and secured between the rod guide 21 and the second base piston under the compressive load applied on both of the tubes.

(f) In the hydraulic shock absorber, the damper tube 12 is fitted on the head portion 21A of the rod guide 21 and clinched, the upper end inner peripheries of the outer tube 13A and the inner tube 13B of the cylinder 13 are fitted respectively on the middle outside-diameter portion 100 and the smaller outside-diameter portion 200 provided below the head portion 21A of the rod guide 21, and the upper end surfaces of the outer tube 13A and the inner tube 13B are brought into contact with the seating surfaces 101, 201 provided on the outer peripheries of the middle outside-diameter portion 100 and the smaller outside-diameter portion 200. The seating surface provided on the outer periphery of the smaller outside-diameter portion 200 of the rod guide 21 has projections 202 rising from a plurality of circumferential positions thereof, and the top surfaces of the projections 202 form contact surfaces P in contact with the end surface of the inner tube 13B in the axial direction. Vertical grooves 204 are each formed between the smaller outside-diameter portion 200 of the rod guide 21 and adjacent projections 202 on the outer periphery thereof, and the non-contacting portions G which are not in contact with the top surfaces of the projections 202, of the end surface of the inner tube 13B, jointly with the vertical grooves 204, form the extension/compression shared passage 43 communicating the rod-side oil chamber 27B with the outside passage 13C.

Up to this point, the preferred embodiments of the present invention have been described in detail by referring to the drawings. However, the invention is not limited to those specific embodiments. It will be understood by those skilled in the art that various modifications and variations in design may be made thereto without departing from the scope of the invention, and all such modifications are also intended to fall within the scope of the invention. For example, the cylinder according to the present invention is not limited to one with two tubes, but may be multiple-layered with N units, namely, three or more tubes fitted together.

Also, the present invention is valid if contact surfaces P, where at least one end surface of the upper and lower end surfaces of (N−1) units of tubes of the cylinder is in contact with the seating surface of at least one of the rod guide and the support piece in the axial direction, are formed intermittently at a plurality of circumferential positions on the end surface of the tubes, in the state where N units of tubes of the cylinder are sandwiched and secured between the rod guide disposed at one end of the damper tube and the support piece (second base piston 60 or the like) disposed at the other end thereof.

The projections, such as the projections 202 as in the preferred embodiments, employed as the means for forming contact surfaces P, where an end surface of the tubes is in contact with the seating surface of at least one of the rod guide and the support piece in the axial direction, intermittently at a plurality of circumferential positions on the end surface of the tubes, the projections may be provided on the side of the rod guide and the support piece or on the side of the cylinder.

The present invention provides a hydraulic shock absorber including a damper tube, a rod guide disposed in one open end portion of the damper tube, a support piece disposed in the other end portion thereof, a cylinder inserted inside the damper tube and sandwiched and secured between the rod guide and the support piece in the axial direction, which is multiple-walled with N units of tubes fitted together, and a piston rod penetrating the rod guide and slidably inserted inside the innermost tube of the cylinder, characterized in that contact surfaces, where at least one end surface of (N−1) units of tubes of the cylinder is in contact with the seating surface of at least one of the rod guide and the support piece in the axial direction, are formed intermittently at a plurality of circumferential positions on the end surface of the tubes in the state where the tubes of the cylinder are sandwiched and secured. Therefore, in the shock absorber, a plurality of tubes (outer and inner tubes) constituting the multiple-walled cylinder inserted inside the damper tube can be sandwiched and secured between the rod guide and the support piece under a compressive load applied to all of the tubes.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the present invention include such modifications and variations as come with the scope of the appended claims and their equivalents.

What is claimed is:

1. A hydraulic shock absorber comprising:
    a damper tube;
    a rod guide disposed in one open end portion of the damper tube;
    a support piece disposed in the other end portion of the damper tube;
    a cylinder inserted inside the damper tube and sandwiched and secured between the rod guide and the support piece in the axial direction, the cylinder being multiple-walled with N units of tubes fitted together; and
    a piston rod penetrating the rod guide and slidably inserted inside the innermost tube of the cylinder,
    wherein contact surfaces, where at least one end surface of (N−1) units of tubes of the cylinder is in contact with a seating surface of at least one of the rod guide and the support piece in the axial direction, are formed at a plurality of discrete circumferential positions on the end surface of the tubes in the state where the tubes of the cylinder are sandwiched and secured.

2. The hydraulic shock absorber according to claim 1, wherein the lengths of the tubes are set relative to each other such that the end surface of the tubes in which the contact surfaces are formed thereon comes into contact with the corresponding seating surface of the rod guide or the support piece earlier than the end surface of the tube in which the contact surfaces are not formed thereon, in the process of sandwiching the tubes of the cylinder therebetween and; wherein a buckling load to work between the end surface of the tubes in which the contact surfaces are formed thereon and the corresponding seating surface of at least one of the rod guide and the support piece is set smaller than a sandwiching and securing load to be applied to the cylinder by the rod guide and support piece disposed in the damper tube.

3. The hydraulic shock absorber according to claim 1, wherein oil passages communicating the inside and the outside of the tubes are formed in non-contacting portions of the end surface, where the end surface of the tubes does not come in contact with the corresponding seating surface of the rod guide or the support piece, of the tubes in which the contact surfaces are formed thereon.

4. The hydraulic shock absorber according to claim 2, wherein oil passages communicating between the inside and the outside of the tubes are formed in non-contacting portions of the end surface, where the end surface of the tubes does not come in contact with the corresponding seating surface of the rod guide or the support piece, of the tubes in which the contact surfaces are formed thereon.

5. The hydraulic shock absorber according to claim 1, wherein the cylinder, which is a double-walled tube of an outer tube and an inner tube, is set inside the damper tube, wherein an oil chamber, including a piston-side oil chamber and a rod-side oil chamber, is formed by the piston rod inserted inside the inner tube, and wherein an outside passage connecting the piston-side oil chamber and the rod-side oil chamber is formed by an annular interspace between the outer tube and the inner tube, and an annular interspace between the damper tube and the outer tube is used as an oil reservoir chamber.

6. The hydraulic shock absorber according to claim 2, wherein the cylinder, which is a double-walled tube of an outer tube and an inner tube, is set inside the damper tube, wherein an oil chamber, including a piston-side oil chamber and a rod-side oil chamber, is formed by the piston rod inserted inside the inner tube, and wherein an outside passage connecting the piston-side oil chamber and the rod-side oil chamber is formed by an annular interspace between the outer tube and the inner tube, and an annular interspace between the damper tube and the outer tube is used as an oil reservoir chamber.

7. The hydraulic shock absorber according to claim 3, wherein the cylinder, which is a double-walled tube of an outer tube and an inner tube, is set inside the damper tube, wherein an oil chamber, including a piston-side oil chamber and a rod-side oil chamber, is formed by the piston rod inserted inside the inner tube, and wherein an outside passage connecting the piston-side oil chamber and the rod-side oil chamber is formed by an annular interspace between the outer tube and the inner tube, and an annular interspace between the damper tube and the outer tube is used as an oil reservoir chamber.

8. The hydraulic shock absorber according to claim 4, wherein the cylinder, which is a double-walled tube of an outer tube and an inner tube, is set inside the damper tube, wherein an oil chamber, including a piston-side oil chamber and a rod-side oil chamber, is formed by the piston rod inserted inside the inner tube, and wherein an outside passage connecting the piston-side oil chamber and the rod-side oil chamber is formed by an annular interspace between the outer tube and the inner tube, and an annular interspace between the damper tube and the outer tube is used as an oil reservoir chamber.

9. The hydraulic shock absorber according to claim 5, wherein the damper tube is fitted on a head portion of the rod guide and clinched, upper end inner peripheries of the outer tube and the inner tube of the cylinder are fitted respectively to a middle outside-diameter portion and a smaller outside-diameter portion provided below the head portion of the rod guide, and the upper end surfaces of the outer tube and the inner tube are brought into contact with seating surfaces provided on the outer peripheries of the middle outside-diameter portion and the smaller outside-diameter portion, wherein the seating surface provided on the outer periphery of the smaller outside-diameter portion of the rod guide has projections rising from a plurality of circumferential positions thereof, and the top surfaces of the projections form contact surfaces in contact with the end surface of the inner tube in the axial direction, and wherein vertical grooves are each formed between the smaller outside-diameter portion of the rod guide and adjacent projections on the outer periphery thereof, and the non-contacting portions which are not in contact with the top surfaces of the projections, of the end surface of the inner tube, jointly with the vertical grooves, form oil passages communicating the rod-side oil chamber with the outside passage.

10. The hydraulic shock absorber according to claim 6, wherein the damper tube is fitted on a head portion of the rod guide and clinched, upper end inner peripheries of the outer tube and the inner tube of the cylinder are fitted respectively to a middle outside-diameter portion and a smaller outside-diameter portion provided below the head portion of the rod guide, and the upper end surfaces of the outer tube and the inner tube are brought into contact with seating surfaces provided on the outer peripheries of the middle outside-diameter portion and the smaller outside-diameter portion, wherein the seating surface provided on the outer periphery of the smaller outside-diameter portion of the rod guide has projections rising from a plurality of circumferential positions thereof, and the top surfaces of the projections form contact surfaces in contact with the end surface of the inner tube in the axial direction, and wherein vertical grooves are each formed between the smaller outside-diameter portion of the rod guide and adjacent projections on the outer periphery thereof, and the non-contacting portions which are not in contact with the top surfaces of the projections, of the end surface of the inner tube, jointly with the vertical grooves, form oil passages communicating the rod-side oil chamber with the outside passage.

11. The hydraulic shock absorber according to claim 7, wherein the damper tube is fitted on a head portion of the rod guide and clinched, upper end inner peripheries of the outer tube and the inner tube of the cylinder are fitted respectively to a middle outside-diameter portion and a smaller outside-diameter portion provided below the head portion of the rod guide, and the upper end surfaces of the outer tube and the inner tube are brought into contact with seating surfaces provided on the outer peripheries of the middle outside-diameter portion and the smaller outside-diameter portion, wherein the seating surface provided on the outer periphery of the smaller outside-diameter portion of the rod guide has projections rising from a plurality of circumferential positions thereof, and the top surfaces of the projections form contact surfaces in contact with the end surface of the inner tube in the axial direction, and wherein vertical grooves are each formed between the smaller outside-diameter portion of the rod guide and adjacent projections on the outer periphery thereof, and the non-contacting portions which are not in contact with the top surfaces of the projections, of the end surface of the inner tube, jointly with the vertical grooves, form oil passages communicating the rod-side oil chamber with the outside passage.

12. The hydraulic shock absorber according to claim 8, wherein the damper tube is fitted on a head portion of the rod guide and clinched, upper end inner peripheries of the outer tube and the inner tube of the cylinder are fitted respectively to a middle outside-diameter portion and a smaller outside-diameter portion provided below the head portion of the rod guide, and the upper end surfaces of the outer tube and the inner tube are brought into contact with seating surfaces provided on the outer peripheries of the middle outside-diameter portion and the smaller outside-diameter portion, wherein the seating surface provided on the outer periphery of the smaller outside-diameter portion of the rod guide has projections rising from a plurality of circumferential positions thereof, and the top surfaces of the projections form contact surfaces in contact with the end surface of the inner tube in the axial direction, and wherein vertical grooves are each formed between the smaller outside-diameter portion of the rod guide and adjacent projections on the outer periphery thereof, and the non-contacting portions which are not in contact with the top surfaces of the projections, of the end surface of the inner tube, jointly with the vertical grooves, form oil passages communicating the rod-side oil chamber with the outside passage.

* * * * *